(12) United States Patent
Sakano et al.

(10) Patent No.: US 11,645,783 B2
(45) Date of Patent: May 9, 2023

(54) CALIBRATION APPARATUS AND CALIBRATION METHOD

(71) Applicant: FAURECIA CLARION ELECTRONICS CO., LTD., Saitama (JP)

(72) Inventors: Morihiko Sakano, Tokyo (JP); Manabu Kawabe, Tokyo (JP); Nobuyuki Matsuyama, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 167 days.

(21) Appl. No.: 17/416,315

(22) PCT Filed: Jul. 3, 2019

(86) PCT No.: PCT/JP2019/026506
§ 371 (c)(1),
(2) Date: Jun. 18, 2021

(87) PCT Pub. No.: WO2020/129286
PCT Pub. Date: Jun. 25, 2020

(65) Prior Publication Data
US 2022/0076453 A1 Mar. 10, 2022

(30) Foreign Application Priority Data
Dec. 19, 2018 (JP) .............................. JP2018-237407

(51) Int. Cl.
*G06T 7/80* (2017.01)
*G06T 7/73* (2017.01)
(Continued)

(52) U.S. Cl.
CPC ................ *G06T 7/80* (2017.01); *B60R 11/04* (2013.01); *G06T 7/248* (2017.01); *G06T 7/74* (2017.01);
(Continued)

(58) Field of Classification Search
CPC .. G06T 7/80; G06T 7/74; G06T 7/248; G06T 2207/10016; G06T 2207/30241;
(Continued)

(56) References Cited

U.S. PATENT DOCUMENTS 9,953,421 B2 * 4/2018 Liu ......................... G06T 7/246
10,248,124 B2 * 4/2019 Bellaiche ............. G05D 1/0285
(Continued)

FOREIGN PATENT DOCUMENTS

WO  WO 2012/143036 A1  10/2012

OTHER PUBLICATIONS

International Search Report of corresponding PCT/JP2019/026506, dated Aug. 6, 2019, 3pp.

*Primary Examiner* — Brian P Yenke
(74) *Attorney, Agent, or Firm* — Volpe Koenig

(57) ABSTRACT

Calibration with high accuracy can be realized even when performing the calibration while running on the actual road. Specifically, the calibration apparatus is mounted in a vehicle and includes: an image acquisition unit configured to acquire captured images obtained by a camera, which is mounted in the vehicle, capturing images of surroundings of the vehicle; a feature point extraction unit configured to extract a plurality of feature points from the captured images; a tracking unit configured to track the same feature point from a plurality of the captured images captured at different times with respect to each of the plurality of feature points, which are extracted by the feature point extraction unit, and record the tracked feature point as a feature point (Continued)

trajectory; a lane recognition unit configured to recognize an own vehicle's lane which is a driving lane on which the vehicle is running, from the captured images; a sorting unit configured to sort out the feature point trajectory, which is in the same plane as a plane included in the own vehicle's lane recognized by the lane recognition unit, among feature point trajectories tracked and recorded by the tracking unit; and an external parameter estimation unit configured to estimate external parameters for the camera by using the feature point trajectory sorted out by the sorting unit.

9 Claims, 9 Drawing Sheets

(51) Int. Cl.
| | |
|---|---|
| *G06T 7/246* | (2017.01) |
| *G06V 10/44* | (2022.01) |
| *G06V 20/56* | (2022.01) |
| *B60R 11/04* | (2006.01) |
| *H04N 17/00* | (2006.01) |

(52) U.S. Cl.
CPC ............ *G06V 10/44* (2022.01); *G06V 20/588* (2022.01); *H04N 17/002* (2013.01); *G06T 2207/10016* (2013.01); *G06T 2207/30241* (2013.01); *G06T 2207/30244* (2013.01); *G06T 2207/30256* (2013.01)

(58) Field of Classification Search
CPC ........... G06T 2207/30244; G06T 2207/30256; G06V 10/44; G06V 20/588; B60R 11/04; H04N 17/002
See application file for complete search history.

(56) References Cited

U.S. PATENT DOCUMENTS

| | | | |
|---|---|---|---|
| 10,917,593 B2* | 2/2021 | Sakano | G06T 7/80 |
| 11,007,934 B2* | 5/2021 | Gupta | B60R 1/00 |
| 11,143,511 B2* | 10/2021 | Sakano | G01S 19/485 |
| 11,282,225 B2* | 3/2022 | Klimovich | G01C 21/30 |
| 11,335,092 B2* | 5/2022 | Zou | G06F 18/251 |
| 11,351,986 B2* | 6/2022 | Sakano | B60W 10/18 |
| 11,417,018 B2* | 8/2022 | Lee | B60R 11/04 |
| 11,431,958 B2* | 8/2022 | Lindgren | G06V 20/588 |
| 2008/0309763 A1* | 12/2008 | Hongo | G08G 1/168 |
| | | | 348/148 |
| 2012/0081512 A1* | 4/2012 | Shimizu | G06T 7/80 |
| | | | 348/36 |
| 2014/0169627 A1* | 6/2014 | Gupta | G06T 7/248 |
| | | | 382/103 |
| 2015/0222813 A1* | 8/2015 | Okude | G06T 7/80 |
| | | | 701/523 |
| 2018/0086284 A1* | 3/2018 | Gupta | G03B 43/00 |
| 2018/0324415 A1* | 11/2018 | Bovyrin | G06V 20/582 |
| 2019/0259178 A1* | 8/2019 | Hafner | G06T 7/248 |
| 2021/0192788 A1* | 6/2021 | Diederichs | G01S 17/86 |
| 2021/0366154 A1* | 11/2021 | Lee | B60R 11/04 |
| 2022/0189065 A1* | 6/2022 | Kawabe | B60R 1/24 |

* cited by examiner (a)

| FEATURE POINT | IMAGE-CAPTURED TIMES OF DAY AND COORDINATES | | | | | STATUS | LOAD |
|---|---|---|---|---|---|---|---|
| | t1 | t2 | t3 | t4 | t5 | | |
| 1001 | (x11,y11) | (x12,y12) | (x13,y13) | (x14,y14) | × | OK | 0.5 |
| 1002 | (x21,y21) | (x22,y22) | (x23,y23) | (x24,y24) | (x25,y25) | UNFINISHED | · |
| 1003 | (x31,y31) | (x32,y32) | (x33,y33) | (x34,y34) | × | OK | 0.1 |
| 1004 | · | (x41,y41) | (x42,y42) | (x43,y43) | × | NG | · |
| · | · | · | · | · | · | · | · |

102A

CALIBRATION APPARATUS AND CALIBRATION METHOD

CROSS-REFERENCE TO RELATED APPLICATION(S)

This application is a U.S. National Phase Patent Application of International Application Number PCT/JP2019/026506, filed on Jul. 3, 2019, which claims priority of Japanese Patent Application Number 2018-237407, filed on Dec. 19, 2018, the entire content of each of which is incorporated herein by reference.

TECHNICAL FIELD

The present invention relates to a calibration apparatus and a calibration method.

BACKGROUND ART

The spread of in-vehicle cameras has been being promoted for the purpose of supporting drivers. An in-vehicle camera is attached to a vehicle at the position and posture based on its design, but the occurrence of errors in the attachment is inevitable. When performing, for example, a distance calculation by using images captured and acquired by the in-vehicle camera, such attachment errors will significantly affect distance accuracy. Therefore, it has been widely conducted to estimate the errors in the attachment of the in-vehicle camera as external parameters in advance and consider the external parameters for the camera when performing, for example, the distance calculation. The external parameters can be calculated by using a specified test pattern inside a factory before shipment from the factory; however, it is known that since the posture of the vehicle changes due to an increase/decrease in the number of passengers and movements of heavy goods in the vehicle, the external parameters also change in a precise sense. Accordingly, there is a demand for estimation of the external parameters, that is, calibration of the external parameters while the vehicle is running on the road. Incidentally, if the external parameters can be calibrated while the vehicle is running, the calculation of the external parameters before the factory shipment can be omitted, which would contribute to a reduction of the work process. PTL 1 discloses an invention for calculating the external parameters by using images captured and acquired by the in-vehicle camera.

CITATION LIST

Patent Literature

PTL1: WO2012/143036

SUMMARY OF THE INVENTION

Problems to be Solved by the Invention

Regarding the invention described in PTL 1, situations capable of the calibration are limited.

Means to Solve the Problems

A calibration apparatus according to a first aspect of the present invention is mounted in a vehicle and includes: an image acquisition unit configured to acquire captured images obtained by a camera, which is mounted in the vehicle, capturing images of surroundings of the vehicle; a feature point extraction unit configured to extract a plurality of feature points from the captured images; a tracking unit configured to track the same feature point from a plurality of the captured images captured at different times with respect to each of the plurality of feature points, which are extracted by the feature point extraction unit, and record the tracked feature point as a feature point trajectory; a lane recognition unit configured to recognize an own vehicle's lane which is a driving lane on which the vehicle is running, from the captured images; a sorting unit configured to sort out the feature point trajectory, which is in the same plane as a plane included in the own vehicle's lane recognized by the lane recognition unit, among feature point trajectories tracked and recorded by the tracking unit; and an external parameter estimation unit configured to estimate external parameters for the camera by using the feature point trajectory sorted out by the sorting unit.

A calibration method according to a second aspect of the present invention is a calibration method executed by a calibration apparatus mounted in a vehicle and including an image acquisition unit configured to acquire captured images obtained by a camera, which is mounted in the vehicle, capturing images of surroundings of the vehicle, wherein the calibration method includes: extracting a plurality of feature points from the captured images; tracking the same feature point from a plurality of the captured images captured at different times with respect to each of the plurality of feature points, which are extracted from the captured images, and recording the tracked feature point as a feature point trajectory; recognizing an own vehicle's lane which is a driving lane on which the vehicle is running, from the captured images, sorting out the feature point trajectory, which is in the same plane as a road surface included in the own vehicle's lane, among tracked and recorded feature point trajectories; estimating external parameters for the camera by using the sorted feature point trajectory.

Advantageous Effects of the Invention

According to the present invention, the calibration can be realized with high accuracy even when performing the calibration while driving on the actual road.

Figure 3:
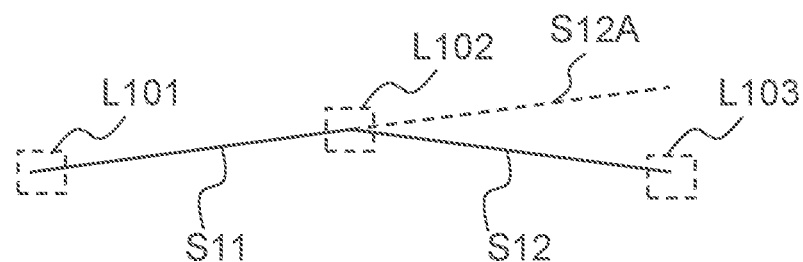
Figure 3:
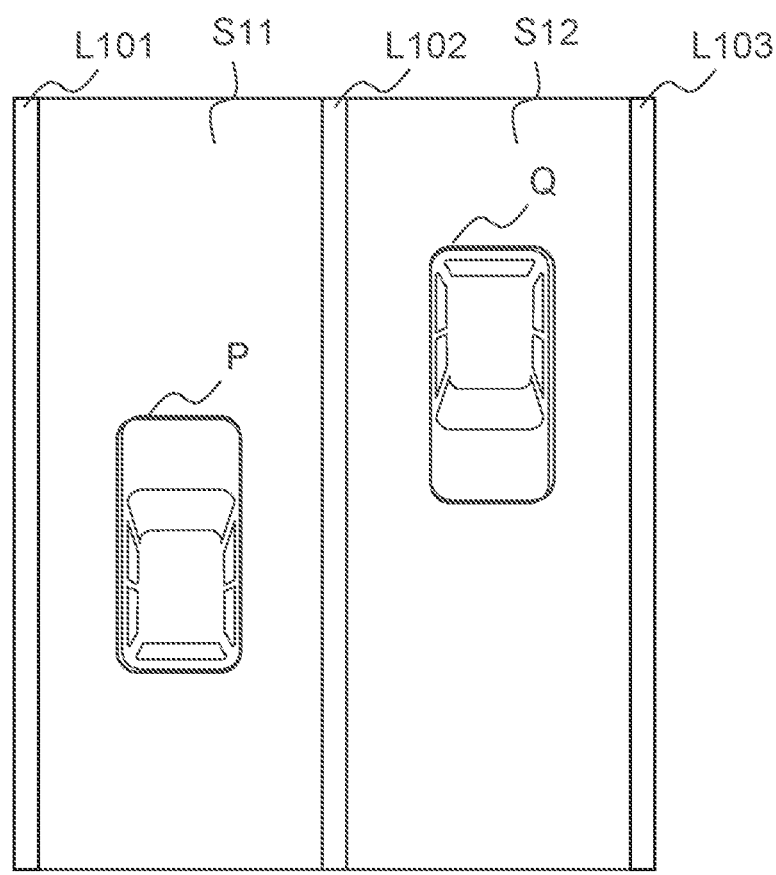
Figure 4:
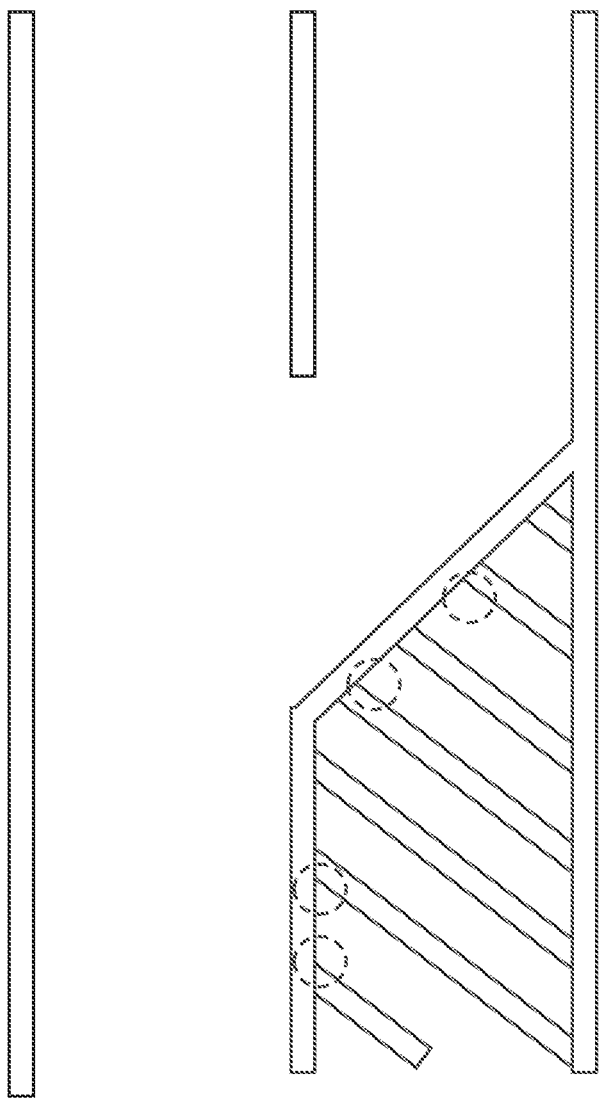
Figure 6:
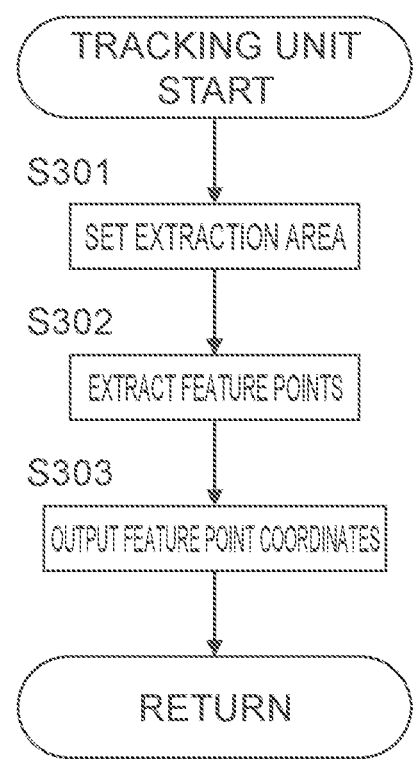
Figure 7:
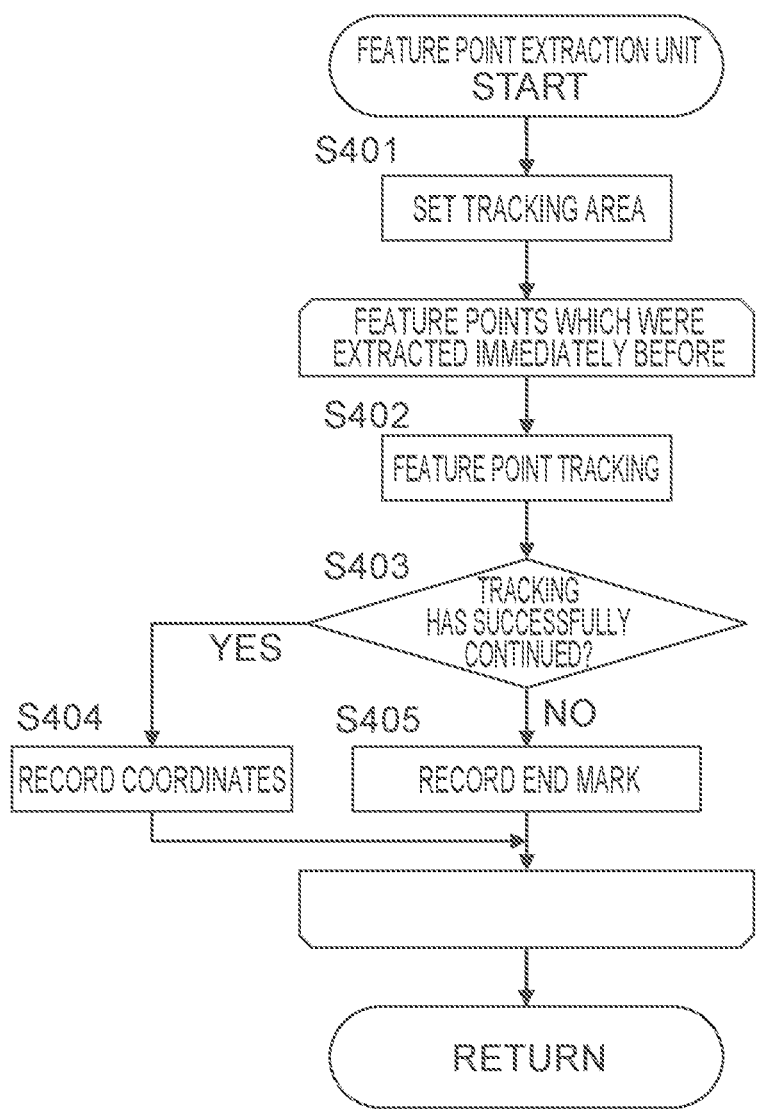
Figure 8:
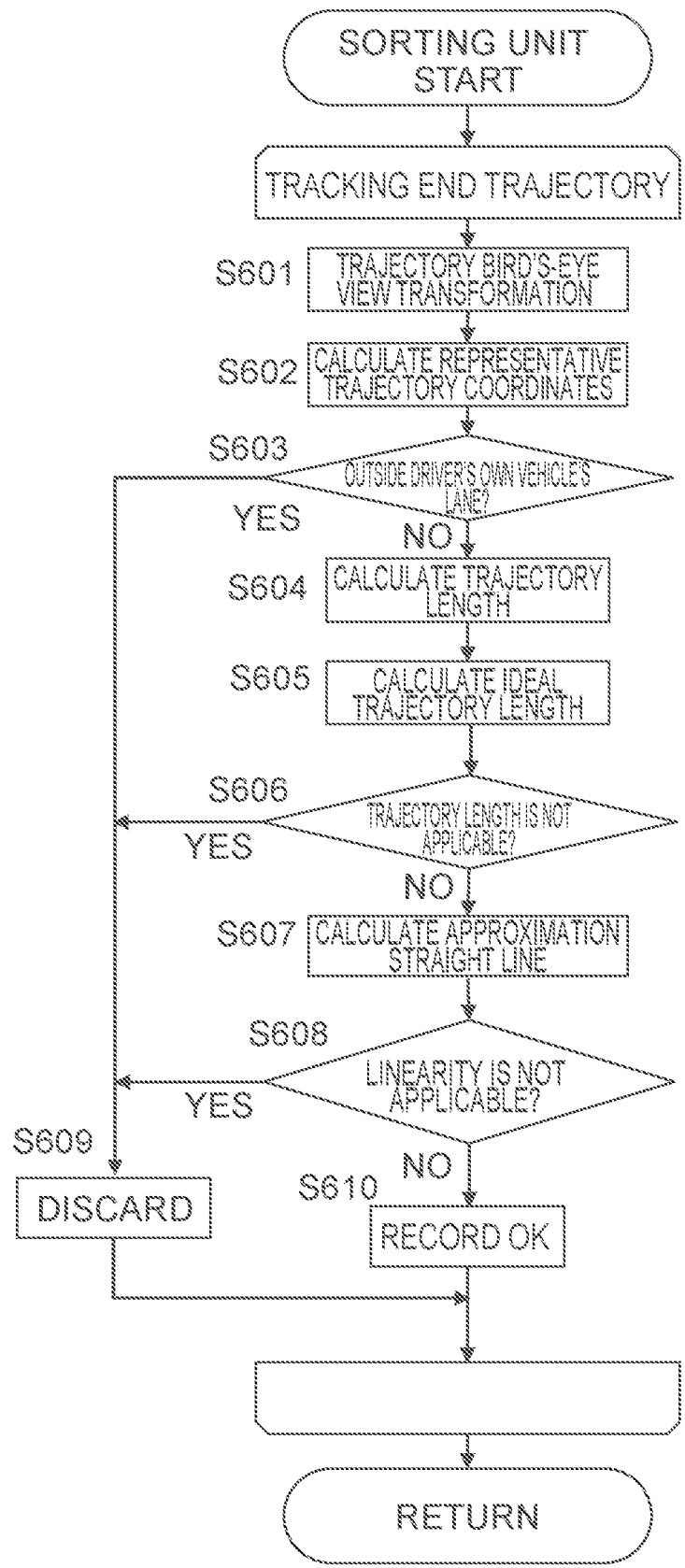

FIG.. 2 is a functional block diagram of a program for calibration while running 103A;

FIG. 3 illustrates a general roadway, FIG. 3(*a*) is a sectional view of the road, and FIG. 3(*b*) is a plan view of the road;

FIG. 4 is a diagram illustrating a road sign indicating off-limits;

FIG. 5 is a diagram illustrating an example of tracking point information 102A;

FIG. 6 is a flowchart illustrating operations of a feature point extraction unit 202;

FIG. 7 is a flowchart illustrating operations of a tracking unit 203;

FIG. 8 is a flowchart illustrating operations of a sorting unit 204; and

Figure 9:
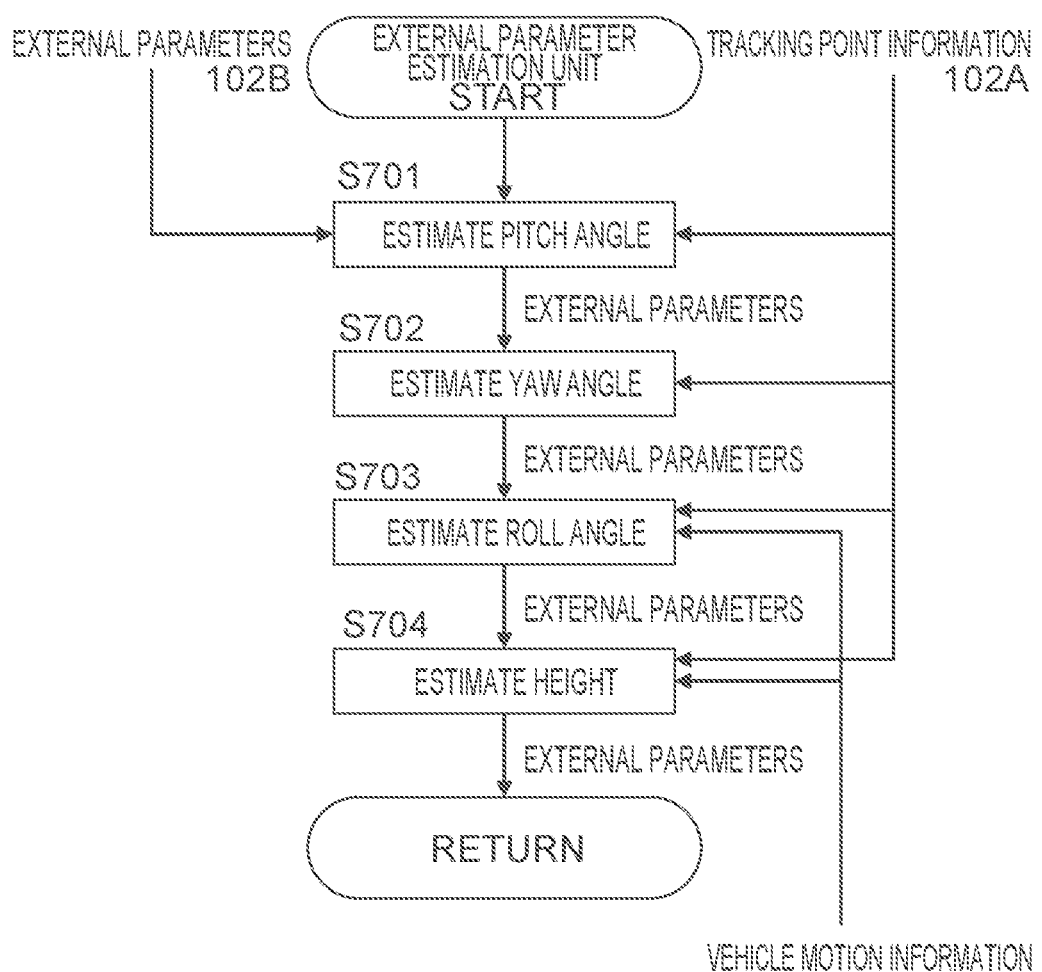

FIG. 9 is a flowchart illustrating operations of an external parameter estimation unit 208

DESCRIPTION OF EMBODIMENTS

First Embodiment

A first embodiment of a calibration apparatus according to the present invention will be explained with reference to FIG. 1 to FIG. 9.

Figure 1:
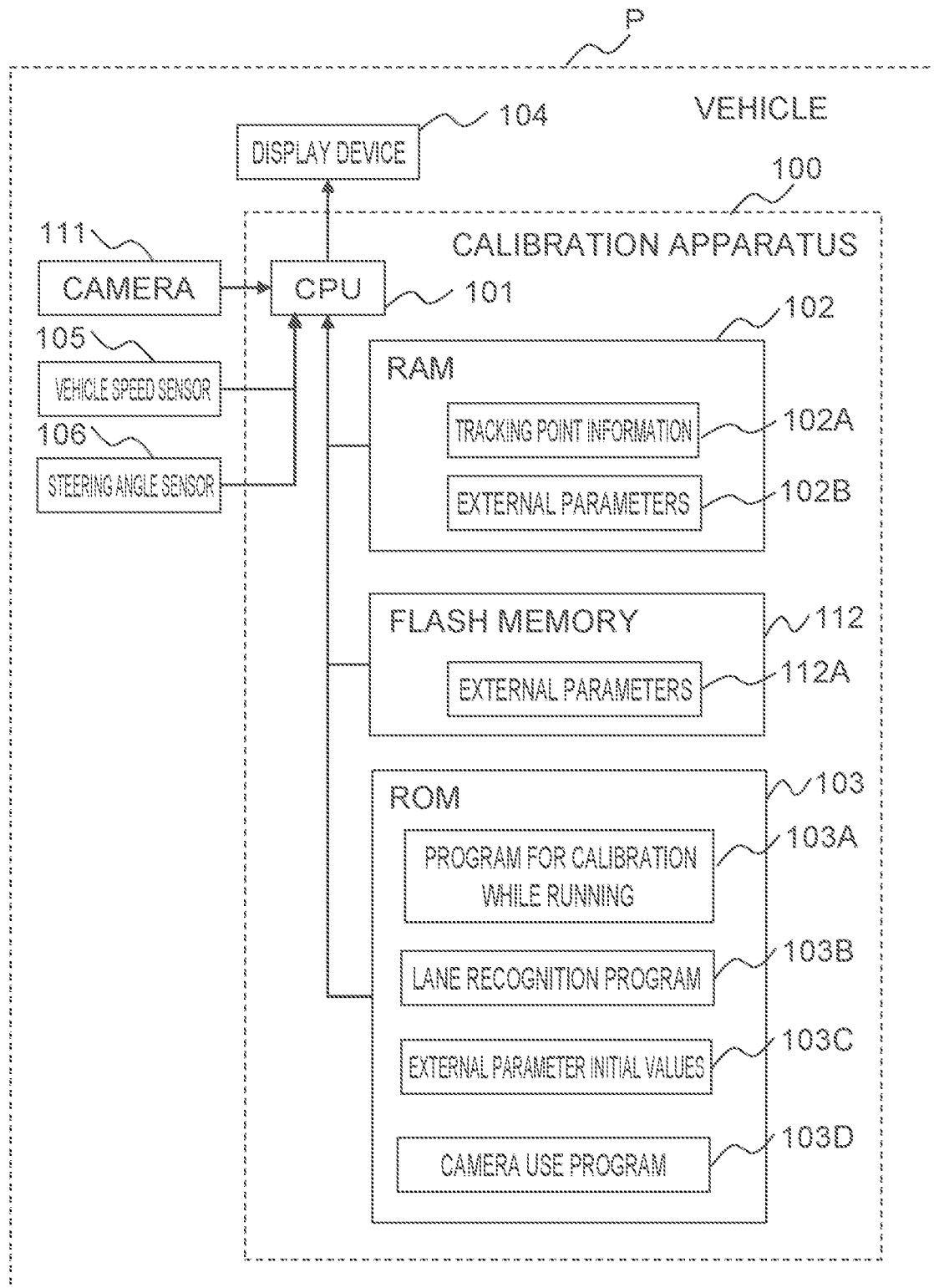
FIG. 1 is a block diagram illustrating the configuration of a vehicle P including a calibration apparatus 100.

FIG. 1 is a block diagram illustrating the configuration of a calibration apparatus 100 according to the present invention and a vehicle P including the calibration apparatus 100. Incidentally, in this embodiment, the vehicle P may be sometimes called a "own vehicle" P in order to distinguish it from other vehicles.

The vehicle P includes: the calibration apparatus 100; a camera 111 for capturing images of the front of the vehicle P; a display device 104 for presenting information to a driver on the basis of an output of the calibration apparatus 100; a vehicle speed sensor 105 for measuring a speed of the vehicle P; and a steering angle sensor 106 for measuring a steering angle of the vehicle P. Information acquired by the camera 111, the vehicle speed sensor 105, and the steering angle sensor 106 is transmitted to the calibration apparatus 100.

The camera 111 is attached to the front of the vehicle P and its optical axis is fixed at a front face of the vehicle P and downwards from a horizontal direction. However, the attached position and mounting posture of the camera 111 indicated here are merely one example and the attached position and the mounting posture of the camera 111 can be various values depending on the design. Set values related to the position and posture of the camera 111 relative to the vehicle P are stored as external parameter initial values 103C in a flash memory 112 described later. However, the occurrence of any deviation from the set values regarding the attachment of the camera 111 to the vehicle P is inevitable and ideal external parameters corresponding to an actual attachment status do not match the external parameter initial values 103C which are the set values.

The camera 111 includes a lens and an image sensor and their characteristics, for example, a lens distortion coefficient which is a parameter indicating the distortion of the lens, an optical axis center, a focal distance, and the pixel number and size of the image sensor are stored as internal parameter initial values in a ROM 103. Also, external parameters 112A calculated by a calibration program described later are saved in a flash memory 112.

The calibration apparatus 100 includes: a CPU 101 which is a central processing unit; a RAM 102 which is a readable/writable storage device; the ROM 103 which is a read-only storage device; and the flash memory 112. The CPU 101 is connected to the RAM 102, the RAM 103, and the flash memory 112 via signal lines.

The CPU 101 decompresses programs, which are stored in the ROM 103, in the RAM 102 and executes them. The RAM 102 stores tracking point information 102A which is used by programs described later, and external parameters 102B. The structure of the tracking point information 102A will be explained later. The external parameters 102B are values in the middle of the calibration process and are used while being rewritten until the end of the calibration.

The ROM 103 stores a program for calibration while running 103A, a lane recognition program 103B, the external parameter initial values 103C, and a camera use program 103D. The program for parameter calibration while punning 103A calibrates the external parameters white the vehicle P is running. Operations of the program for calibration while running 103A will be explained later. The lane recognition program 103B recognizes lane marks painted on a road surface, for example, positions and types of white lines in images captured by the camera 111. Various known technologies can be used for the lane recognition program, for example, lane recognition using edge extraction via a Prewitt filter is employed.

The external parameter initial values 103C are the set values of the external parameters as described earlier The camera use program 103D is a program which utilizes the camera 111; and, for example, the camera use program 103D calculates the distance between the own vehicle P and surrounding vehicles by using images captured and acquired by the camera 111 and displays a warning on the display device 104 if that distance is less than a specified distance. The camera use program 103D needs the external parameters and the internal parameters of the camera 111 for executing the program, so that it reads them from the flash memory 112. If the external parameters 112A and the internal parameters are not saved in the flash memory 112, the camera use program 103D uses the internal parameter initial values and the external parameter initial values 103C which are saved in the ROM 103.

The flash memory 112 is a nonvolatile storage medium and the flash memory 112 stores the external parameters 112A output from the program for calibration while running 103A. Incidentally, in this embodiment, an explanation will be provided only about the calibration of the external parameters; however, the calibration apparatus 100 may perform the calibration of the internal parameters.

Figure 2:
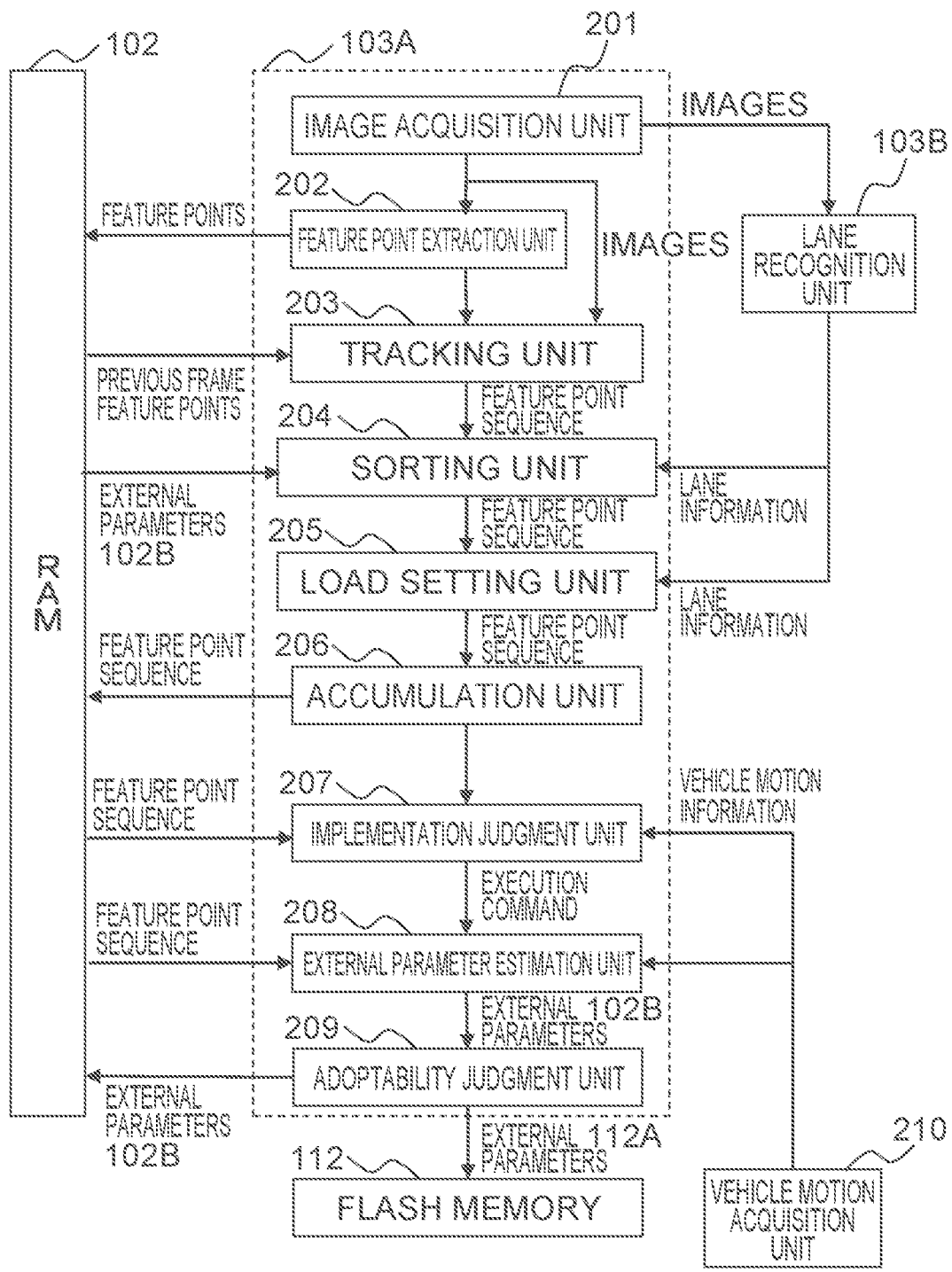

FIG. 2 illustrates functions of the program for calibration white running 103A, which are to be executed by the CPU 101, as functional blocks and is a diagram showing a flow of data between the functional blocks and between the functional blocks and the RAM 102. Incidentally, in this embodiment, the lane recognition program 103 will be also referred to as a lane recognition unit 103.

The program for calibration while running 103A includes, as its functions, an image acquisition unit 201, a feature point extraction unit 202, a tracking unit 203, a sorting unit 204, a load setting unit 205, an accumulation unit 206, an implementation judgment unit 207, an external parameter estimation unit 208, an adoptability judgment unit 209, and a vehicle motion acquisition unit 210. Incidentally, the vehicle motion acquisition unit 210 is illustrated outside the program for calibration while running 103A for convenience of figure drawing in FIG. 2. The image acquisition unit 201, the feature point extraction unit 202, and the tracking unit 203 are executed every time the camera 111 captures an image.

The camera 111 captures images continuously at high frequency, for example, 30 times per second. The images captured and obtained by the camera 111 (hereinafter referred to as the captured images) are transmitted to the calibration apparatus 100 every time an image is captured. The image acquisition unit 201 receives the captured images from the camera 111 and outputs the received captured images to the feature point extraction unit 202, the tracking unit 203, and the lane recognition unit 103B. For example, every time a captured image is input from the camera 111, the image acquisition unit 201 outputs the captured image to the feature point extraction unit 202, the tracking unit 203, and the lane recognition unit 103B. However, the image acquisition unit 201 may be configured so that a captured image is output every other time for the purpose of, for example, a reduction of processing load.

The vehicle motion acquisition unit 210 outputs the speed and steering angle of the own vehicle P which are transmitted from the vehicle speed sensor 105 and the steering angle sensor 106, as vehicle motion information, to the program for calibration while running 103A. However, the vehicle motion acquisition unit 210 may output the acquired information as an instantaneous value or by arithmetically operating the acquired information, for example, integrating the acquired information.

The feature point extraction unit 202 extracts feature points by executing imaging processing on the captured images which are input by the image acquisition unit 201. The feature points herein used mean intersection points of edges such as corners of walls, corners of curbstones, corners of broken lines, and corners of pedestrian crossings in the images, that is, corner feature points. The corner feature points can be extracted by applying, for example, the Harris operator which is a known technology. The feature points extracted by the feature point extraction unit 202 can be identified by, for example, coordinates in a captured image of the camera 111. In this embodiment, the upper left of the captured image is defined as an origin, the right side is defined as a positive direction of the X-axis, and the downward side is defined as a position direction of the Y-axis, information of the feature points extracted by the feature point extraction unit 202 is saved in the RAM 102.

The tracking unit 203 executes tracking processing by targeting the feature points acquired from an immediately preceding captured image, which has been read from the RAM 102, by using the latest captured image which is input from the image acquisition unit 201. Specifically speaking, the tracking unit 203 tracks the feature points in the captured images which were captured at different times-of-day, and calculates trajectories of the feature points. Known tracking methods such as the SAD (Sum of Absolute Difference), the SSD (Sum of Squared Difference), and the LK (Lucas-Kanade) methods are used to track the feature points. Then, information about the tracked feature points is output to the sorting unit 204.

The sorting unit 204 outputs the trajectories acquired by the tracking unit 203, that is, the feature points, from which inappropriate feature points to be used for the calibration are excluded, from among a plurality of feature points. The inappropriate feature points to be used for the calibration are classified into, for example, the following three groups. Firstly, feature points which do not exist in the same plane as a road surface where the own vehicle runs; secondly, feature points which are acquired by erroneous tracking; and thirdly, feature points acquired when the own vehicle P is in an unstable posture. The details will be explained below.

An explanation will be provided about the feature points which do not exist in the same plane as the road surface where the own vehicle runs, and which belong to the first classification group in order to implement the calibration of the external parameters with high accuracy, the feature points to be used for the arithmetic operation are required to exist in the same plane as the road surface where the own vehicle P is running. Specifically speaking, feature points of objects which exist away from the road surface in a height direction, for example, road signs, other vehicles, walls, and curbstones will hinder the calibration with high accuracy. Furthermore, the feature points on a road surface of the road where the own vehicle P is running, but on the road surface which is not the same plane as that of where the own vehicle P is running will also hinder the calibration with high accuracy. The feature points on the road surface of the road, but on the road surface which is not the same plane as that of where the own vehicle P is running will be explained in detail with reference to FIG. 3.

It is designated by laws and regulations that a roadway where the vehicle P runs should have a several percentage slope in a widthwise direction of the roadway, that is, a cross slope for the purpose of, for example, draining of rainwater. Therefore, as illustrated in FIG. 3, the roadway is often configured so that a central part of the road-way is high and the height of the roadway becomes gently lower in the widthwise direction of the road FIG. 3 is a diagram illustrating a general roadway, and FIG. 3(a) is a sectional view of the road and FIG. 3(b) is a plan view of the road. However, a slope angle is emphasized in FIG. 3(a). Referring to FIG. 3, the own vehicle is a vehicle indicated with the reference numeral P and a white line L101, a center line L102, and a white line L103 are drawn on the roadway. An oncoming vehicle Q is running on the other side of the center line L102 opposite the own vehicle P.

Under this circumstance, a road surface where the own vehicle P is running will be referred to as a first face S11; and a road surface where the oncoming vehicle Q is running will be referred to as a second face S12. Referring to FIG. 3(a), the first face S11 and the second face S12 are symmetrical to each other relative to a perpendicular plane which passes through the center line L102, as their center. In other words, the second face S12 is a plane different from a virtual second face S12A which is formed by extending the first face S11 from the renter line L102. Therefore, assuming that the calibration apparatus 100 mistakenly recognizes that feature points existing in an area beyond the center line L102, for example, characters and marks drawn on the road surface exist in the same plane as the first face S11, which is the road surface where the own vehicle P is running, and uses such feature points for the calibration, the calculated external parameters will include large errors, which is not desirable.

If the inclination of the second face S12 is as illustrated in the drawing, the calibration apparatus 100 can correct the position of a feature point according to the distance from the center line L102. However, in fact, the relationship between the second face S12 and the first face S12 is unknown unless it is measured by a sensor or the like; and adding the sensor would cause a cost problem, which is not desirable. Therefore, by limiting the feature points to be used for the calibration within the range of a driving lane where the own vehicle P is running, it is possible to avoid using the feature points, which do not exist in the same plane, for the calibration without using the additional sensor.

The sorting unit 204 uses lane position information which is output from the lane recognition unit 103B in order to exclude the feature points which do not exist on the road surface plane. In this embodiment, the driving lane where the own vehicle is running will be referred to as the "own vehicle's lane." The sorting unit 204 keeps only feature point trajectories inside the own vehicle's lane and discard feature point trajectories outside the own vehicle's lane. Since the lane can be recognized by the known image recognition technology with low processing load and high accuracy, the feature point trajectories outside the road surface plane can be discarded accurately.

Furthermore, by limiting to a narrow plane range of only the own vehicle's lane, it is possible to secure necessary feature point trajectories for the calibration and minimize the influence of the road cross slope. Since the road cross slope has inflection points at a boundary with a median strip or an adjacent lane for a one-side alternate passage, the feature point trajectories can be acquired only from the range which does not include the inflection points of the road cross slope and can be considered as substantially on the road surface plane, by limiting to within the range of the own vehicle's lane. Furthermore, trajectories tracking oncoming vehicles or the like can be also excluded. The first classification group has been explained above.

The feature points acquired by erroneous tracking, which belong to the second classification group, are, for example, feature points which are accidentally tracked due to the positional relationship between the feature points. The feature points which belong to the third classification group and are acquired when the own vehicle P was in an unstable posture are, for example, feature points acquired from the captured images when the own vehicle P was shaking due to a bumpy road surface. The sorting unit 204 uses the information acquired from the vehicle motion acquisition unit 210 in order to exclude the feature points of the second and third classification groups. The sorting unit 204 calculates the length of a feature point trajectory on the road surface plane which can be assumed from the vehicle speed acquired from the vehicle motion acquisition unit 210 and the image acquisition time interval. Then, the sorting unit 204 excludes a feature point(s) regarding which the length of the acquired feature point trajectory is not conformable, by considering it as a feature point including an error due to the influence of the erroneous tracking or the shaking. Incidentally, the case where the length of the feature point trajectory is not conformable includes a case where the length of the feature point trajectory does not satisfy a specified value.

The sorting unit 204 excludes inappropriate feature points to be used for the calibration while running, by excluding the trajectories of the relevant feature points which belong to the above-described first to third classification groups. In other words, the sorting unit 204 sorts out the feature points which have not been excluded, by excluding the inappropriate feature points. Any feature points which are considered to have problems in the image recognition accuracy are handled by the load setting unit 205 which will be explained next. The sorting unit 204 outputs the sorted feature point trajectories to the load setting unit 205.

The load setting unit 205 sets a degree of emphasis, that is, a load to each of the feature point trajectories which are output from the sorting unit 204 when using the relevant feature point trajectory for the calibration. The load setting unit 205 sets the load according to the assumed image recognition accuracy. In other words, the load setting unit 205 sets: a larger load to the accuracy which is assumed to be higher; and a smaller load to the accuracy which is assumed to be lower. For example, the load is set as follows by utilizing the line type of a white line and the shape of the white line. Moreover, the load setting unit 205 may set the load by calculating a score of a corner shape as described later. The sorting unit 204 assigns the load to the feature point trajectory data, for example, in the format illustrated in FIG. 5 described later.

The feature points are basically to extract the corner feature points as explained earlier; however, a white line which is a solid line may sometimes be erroneously recognized as if it has a corner feature point due to the influence of subtle shades and shadows or between wheels of the vehicle P and a lane marker. Accordingly, by using line type information acquired by the lane recognition unit 103B, the load setting unit 205; assigns a small load if a feature point exists in the solid line; and assigns a large load if the feature point exists in a broken line. This is the case of using the line type of the white lines.

FIG. 4 is a diagram illustrating a road sign indicating off-limits which is drawn on a roadway, for example, near the position where the number of lanes increases or decreases such as in front of an intersection. Regarding the road sign indicating off-limits, a corner which is not a 90-degree angle is configured in each area indicated with a small circle with a broken line in the drawing. Regarding this corner, the coordinates of the corner feature point to be calculated tend to deviate from their true positions. Therefore, the load setting unit 205 calculates the score of the corner shape according to a known image recognition technology such as the strength of the Harris operator and assigns the load according to the score. Incidentally, the score of the corner shape can be also called "corner strength." If the score is large, the relevant shape looks more like a corner and, therefore, a large load is assigned; and if the score is small, a small load is assigned. This is the case of utilizing the shape of the white lines.

The accumulation unit 206 records the feature point trajectories, which are output from the load setting unit 205, in the RAM 102.

The implementation judgment unit 207 judges whether it is possible to perform the calibration or not. If the calibration is performed in a state where the total number of feature point trajectories is small, a significantly wrong calibration result is obtained if a series of errors is included. So, the calibration is implemented at the stage where a predetermined number of, or more than the predetermined number of, the feature point trajectories are accumulated. Moreover, in order to implement the calibration, feature point trajectories are required in each of both areas on the right side and the left side in a traveling direction as viewed from the center of the own vehicle. Therefore, when a predetermined specified number of feature point trajectories are obtained in each of the areas on the right side and the left side as viewed from the center of the own vehicle, an execution command is issued to the external parameter estimation unit 208.

The external parameter estimation unit 208 performs bird's-eye view transformation of the positions of the feature point trajectories obtained by the processing which has been executed so far, by using the current external parameters 102B so as to create a view looking down from above the own vehicle P. Then, the external parameter estimation unit 208 estimates 3-axis angles and height of the camera by using angles and lengths of the feature point trajectories at a bird's-eye view point. The 3-axis angles mean a roll angle, a pitch angle, and a yaw angle of the camera. The obtained feature point trajectories are feature point trajectories obtained from the road surface plane which the vehicle P contacts when the vehicle P moves straight ahead. So, if the 3-axis angles and the height of the camera matches the external parameters 102B used for the arithmetic operation, a plurality of feature points trajectories at the bird's-eye view point flow in parallel with each other and perpendicularly to a vertical direction in a bird's-eye view video and become a specified length. This feature point trajectory is an ideal trajectory.

If the 3-axis angles and the height of the camera do not match the external parameters 102B used as operators, that is, if the external parameters 102B include an error, characteristic differences from the ideal trajectory occur with respect to the respective feature point trajectories at the bird's-eye view point. If the pitch angle has an error, the feature point trajectories at the bird's-eye view point spread in an inverted V-shape. If the yaw angle has an error, the difference occurs between the lengths of the feature point trajectories on the right and left sides of the own vehicle P at the bird's-eye view point. If the roll angle has an error, the entire feature point trajectory rotates obliquely. If the camera height has an error, the difference from a specified length of the feature point trajectory occurs.

The external parameter estimation unit 208 implements the calibration by changing each parameter and correcting each parameter by using the known optimization technology so that the relevant trajectory will become closer to the ideal trajectory. The details will be explained later. After the estimation by the optimization processing terminates, the external parameters 102B are output to the adoptability judgment unit 209.

The adoptability judgment unit 209 receives the output from the external parameter estimation unit 208 and judges whether the parameters can be adopted as final parameters or not. If it is determined that the parameters may be adopted as the final parameters, the external parameters 102B are written as the external parameters 112A to the flash memory 112. If it is determined that the parameters may not be adopted as the final parameters, they are written as the external parameters 102B still in the process of estimation to the RAM 102, and will be used as initial values when the next image is input.

The adoptability judgment unit 208 judges whether the parameters may be determined as the final parameters or not, from three points of view, that is, a convergence judgment, a number-of-times judgment, and an image judgment. The convergence judgment is to judge whether changes have become sufficiently small as compared to past values. The number-of-times judgment is to perform verification a plurality of number of times and judge whether or not the same value is obtained within a specified range. The image judgment is to perform verification with a bird's-eye view image and judge whether it is a video which shows an accurate bird's-eye view or not.

If all the convergence judgment, the number-of-times judgment, and the image judgment are satisfied, the adoptability judgment unit 209 determines that the parameters may be adopted as the final parameters, and then writes them to the flash memory 112. If the adoptability judgment unit 209 determines that only the convergence judgment end the image judgment are satisfied, the adoptability judgment unit 209: counts up the number of times when the number-of-times judgment is satisfied, clears the feature point sequences and the external parameters 102B still in the arithmetic operation process, which are stored in the RAM 102; and resumes from the initial state.

(Tracking Point Information 102A)

FIG. 5 is a diagram illustrating an example of tracking point information 102A which is saved in the RAM 102. The tracking point information 102A stores information of the coordinates, the status, and the load with respect to each feature point. However, the information of the coordinates of each feature point is recorded for each time-of-day. Rows of FIG. 5 represent individual feature points; and columns represent the coordinates of the relevant feature point in the raptured images at times-of-day t1 to t5, the status of the relevant feature point trajectory, and weight.

Numbers assigned to the feature points, that is, 1001, 1002, and so on are identifiers for identifying the feature points; and the numbers obtained by sequentially assigning serial numbers to the feature points in the extracted order are used here for convenience's sake. FIG. 5 illustrates that three feature points were extracted from an image captured at the time-of-day t1; and similarly, four feature points were extracted from images captured at the times-of-day t2, t3, t4, and one feature point was extracted from an image captured at the time-of-day t5, and they were successfully tracked. It is shown that regarding three feature points, that is, a feature point 1001, a feature point 1002, and a feature point 1003 among the four feature points extracted from the images captured at the times-of-day t2, t3, the tracking continued from the time-of-day t1.

Since the feature points 1001, 1003, 1004 were not extracted from the image captured at the time-of-day t5, an "x" mark is assigned in FIG. 5. Incidentally, the example illustrated in FIG. 5 displays only the times-of-day t1 to t5, the times-of-day are not limited to this example. If the times-of-day are increased, a table size will become infinitely larger and the memory will be compressed. So, the table will be utilized cyclically according to, for example, the known ring buffer technology. The "status" column of the tracking point information 102A is referenced when judging whether the relevant feature point is to be used for the calibration or not. This column records: "UNFINISHED" when the tracking of the feature point is continuing; "NG" for the trajectory discarded by the sorting unit 204; and "OK" for the trajectory which has passed through the sorting unit 204. The "load" column of the tracking point information 102A indicates the degree of emphasis assigned by the load setting unit 205 when the relevant feature point is used for the calibration. The load functions so that a feature point trajectory with a higher value becomes preferentially closer to the ideal trajectory. The load is assigned to a trajectory which has passed through the toad setting unit 205.

(Operations of Feature Point Extraction Unit 202)

FIG. 6 is a flowchart illustrating operations of the feature point extraction unit 202. The feature point extraction unit 202 executes the following operations every time a captured image is transmitted from the image acquisition unit 201. An execution subject of each step explained below is the CPU 101.

In step S301, the feature point extraction unit 202 decides an area in a captured image from which the feature point extraction unit 202 extracts feature points on the basis of a traveling direction of the vehicle P and an image capturing direction of the camera 111 relative to the traveling direction of the vehicle P. For example, if the vehicle P moves forward, time capable of tracking feature points is short because the camera 111 is attached to the front of the vehicle P and the feature points rapidly move out of a view angle of the camera 111 even if the feature points are extracted at positions close to the vehicle P. A wider processing area requires a longer time for calculation processing, so that it is necessary to reduce a calculation processing load of such wasteful portions in order to perform the calculation by real-time processing. So, the processing area is set to extract feature points at a position away from the vehicle P. Incidentally, if the camera 111 is attached to the vehicle P to capture images of behind the vehicle P, the processing area is set on the side close to the vehicle P when the vehicle P moves forward. Next, the processing proceeds to step S302.

In step S302, the feature point extraction unit 202 extracts feature points by targeting the feature point extraction area which was set in step S301. It is particularly preferable to extract a corner feature point(s) which is an edge intersection point. The feature point extraction unit 202 extracts the corner feature point(s) by applying the Harris operator or the like to the area which was set in step S301, and then proceeds to step S303. In step S303, the feature point extraction unit 202 outputs the coordinates of the feature points extracted in step S302 to the RAM 102 and terminates the flowchart in FIG. 6

(Operations of Tracking Unit 203)

FIG. 7 is a flowchart illustrating operations of the tracking unit 203. The tracking unit 203 executes the following operations every time a captured image is transmitted from the image acquisition unit 201. An execution subject of each step explained below is the CPU 101.

In step S401, the tracking unit 203 sets a processing area as a target of the feature point tracking processing. Specifically speaking, regarding a captured image which was captured immediately before by the camera 111, moving directions and distances of the feature points extracted from the immediately preceding captured image are estimated by using the coordinates at which the feature points were extracted by the feature point extraction unit 202, and motion information of the vehicle P acquired by the vehicle motion acquisition unit 210. Then, an area corresponding to the estimated moving directions and distances of the feature points is decided as an area in the captured image for the tracking unit 203 to track the feature points. Next, the processing proceeds to step S402.

However, the captured image which is used to estimate the moving directions and distances of the feature points is not limited to the immediately preceding captured image and a plurality of captured images may be used for the estimation or captured images other than the immediately preceding captured image may be used for the estimation. Specifically speaking, a captured image which was captured at much earlier time may be used to estimate the moving directions and distances of the feature points.

Steps S402 to S405 which will be explained next are repeatedly executed as many times as the number corresponding to the feature points extracted in the immediately preceding raptured image. In step S402, the tracking unit 203 tracks the feature points in the immediately preceding captured image, which is the tracking target read from the RAM 102, by a publicly known method such as the SAD or the LK method mentioned earlier, and then proceeds to step S403. In step S403, the tracking unit 203 judges whether the tracking of the feature points in the immediately preceding captured image, which is the tracking target, has been successfully continued or not.

For example, if a matching degree by the SAD or the like is equal to or smaller than a predetermined threshold value, the tracking unit 203 determines that the tracking cannot be performed because of the reason, for example, the relevant feature point has moved out of the view angle of the camera. Moreover, if the relevant feature point has passed through a predetermined certain line in the image or has moved out of a specified area, the tracking unit 203 forcedly terminates the tracking. The reason for the forced termination of the tracking is because it is assumed that the feature point will be out of the view angle of the camera 111 in the next captured image or because the distance from the subject becomes far and it is unnecessary to track that feature point. If the tracking unit 203 determines that the tracking has been successfully continued, the processing proceeds to step S404; and if it is determined that the tracking should terminate, the processing proceeds to step S405.

In step S404, the tracking unit 203 records the coordinates of the tracked feature point in a row of the processing-target feature point in the tracking point information 102A and in the time-of-day column at which the processing-target captured image was captured. In step S405, the tracking unit 203 records a mark indicating the termination of the tracking, for example, "x" in the row of in the row of the processing-target feature point in the tracking point information 102A and in the time-of-day column at which the processing-target captured image was captured. After the execution of step S404 or step S405 is completed, whether steps S402 to S405 have been executed or not is judged with respect to the feature points extracted from the immediately preceding captured image; and if there is any unprocessed feature point, the processing returns to step S402; and if it is determined that the processing has been completed with respect to all the feature points, the flowchart in FIG. 7 is terminated.

(Operations of Sorting Unit 204)

FIG. 8 is a flowchart illustrating operations of the sorting unit 204. The sorting unit 204 executes the following operations every time a captured image is transmitted from the image acquisition unit 201. An execution subject of each step explained below is the CPU 101.

The sorting unit 204 executes S601 to S610, which will be explained below, by targeting all the trajectories on which the tracking was terminated in the immediately preceding processing. For example, the tracking point information 102A is as illustrated in FIG. 5; and in the processing immediately after the time-of-day t5, the sorting unit 204 executes S601 to S610 by setting each of the feature point 1001, the feature point 1003, and the feature point 1004 as a processing-target feature point trajectory. In step S601, the sorting unit 204 performs the bird's-eye view transformation of the trajectory with the current external parameters 102B and proceeds to step S602. Incidentally, if the external parameters 102B do not match the ideal external parameters, the trajectory on which the bird's-eye view transformation has been performed does not match the ideal trajectory and becomes a trajectory generally dose to the bird's-eye view point.

In step S602, the sorting unit 204 calculates representative trajectory coordinates with respect to the processing-target feature point trajectory in order to judge the positional relationship between the processing-target feature point trajectory and the own vehicle's lane in the next step. The representative trajectory coordinates are, for example, average values of the coordinates obtained by executing the bird's-eye view transformation of the coordinates of all the feature points which constitute the processing-target feature point trajectory. The representative trajectory coordinates may be coordinates of a feature point with the farthest distance from the own vehicle P in the vehicle's widthwise direction among the coordinates obtained by the bird's-eye view transformation of the coordinates of all the feature points constituting the processing-target feature point trajectory. The sorting unit 204 calculates the representative trajectory coordinates and then proceeds to step S603.

In step S603, the sorting unit 204 acquires image coordinates of the lane where the own vehicle P is running, which are output from the lane recognition unit 103B, and calculates a lane position at the bird's-eye view point by using the current external parameters 102B. The sorting unit 204 compares the lane position at the bird's-eye view point with the representative trajectory coordinates calculated in step S602. If the sorting unit 204 determines that the representative trajectory coordinates are outside the lane, the processing proceeds to step S209; and if the sorting unit 204 determines that the representative trajectory coordinates are inside the lane, the processing proceeds to step S604.

In step S604, the sorting unit 204 calculates the length of the processing-target feature point trajectory. The length of the feature point trajectory is, for example, the Euclidean distance between the coordinates of a starting point and the coordinates of an end point of the trajectory which constitute the feature point trajectory at the bird's-eye view point. After the sorting unit 204 calculates the length of the feature point trajectory, the processing proceeds to step S605. In step S605, the sorting unit 204 calculates an ideal trajectory length by calculating a product of the vehicle speed acquired by the vehicle motion acquisition unit 210 and the image acquisition time interval and the processing proceeds to step S606. For example, if the vehicle speed is 36 km/h and the image acquisition time interval is 0.1 seconds, the ideal trajectory length is 10 m. Incidentally, the order of step S604 and step S605 may be switched or steps S604 and S605 may be executed in parallel with each other.

In step S606, the sorting unit 204 compares the trajectory length calculated in step S604 with the ideal trajectory length calculated in step S605. If the sorting unit 204 determines that the difference between the ideal trajectory length and the trajectory length is larger than a predetermined specified length, the processing proceeds to step S609. If the sorting unit 204 determines that the difference between the ideal trajectory length and the trajectory length is smaller than the predetermined specified length, that feature point trajectory is applicable to be used for the calibration and, therefore, the processing proceeds to step S607.

In step S607, the sorting unit 204 finds an approximation straight line regarding the feature point trajectory, which was judged as applicable in step S606, by a known technology such as the least squares method. In step S608, the sorting unit 204 judges the linearity of the feature point trajectory. The sorting unit 204 judges the linearity of the feature point trajectory, for example, as follows. Specifically speaking, the sorting unit 204 calculates the distances between the approximation straight line calculated in step S607 and the respective coordinates of the feature point trajectory and compares a magnitude relationship between an average value of the distances and a predetermined specified amount. If the sorting unit 204 determines that the average value of the distance is larger than the predetermined specified amount, it judges that the linearity is not applicable, and the processing proceeds to step S609. If the sorting unit 204 determines that the average value of the distance is equal to or less than the predetermined specified amount, it judges that the linearity is applicable, and processing proceeds to step S610.

In step S609, the sorting unit 204: discards the processing-target feature point trajectory because it is inappropriate to be used for the calibration; and writes "NG" in the status column of the tracking point information 102A. In step S610, the sorting unit 204 writes "OK" in the status column of the tracking point information 102A because the processing-target feature point trajectory is appropriate to be used for the calibration. After step S609 or step S610 is completed, the sorting unit 204 judges whether or not the processing of step S601 and subsequent steps has been executed by targeting all the trajectories regarding which the tracking was terminated in the immediately preceding processing. If the sorting unit 204 determines that there is an unprocessed trajectory, it executes the processing of step S601 and subsequent steps by setting the relevant trajectory as a processing target; and if the sorting unit 204 determines that the processing of step S601 and subsequent steps has been executed by targeting all the trajectories, it terminates the processing illustrated in FIG. 8.

(Operations of External Parameter Estimation Unit 208)

FIG. 9 is a flowchart illustrating operations of the external parameter estimation unit 208. The external parameter estimation unit 208 executes the following operations every time it receives an execution command from the implementation judgment unit 207. An execution subject of each step explained below is the CPU 101.

In step S701, the external parameter estimation unit 208 estimates a pitch angle. The external parameter estimation unit 208 uses the information of feature point trajectories regarding which "OK" is entered in the status column of the tracking point information 102A, and the external parameters 102B which are stored in the RAM 102, for an arithmetic operation. The external parameter estimation unit 208 designs an objective function for evaluating parallelism of the feature point trajectory and implements the estimation of the pitch angle by minimizing the objective function regarding the pitch angle by a known technology.

The objective function in step S701 standardize on a function for evaluating parallelism of two feature point trajectories. The external parameter estimation unit 208 creates a plurality of pairs of two feature point trajectories and designs a total sum of all the objective functions as the objective function for estimating the pitch angle. Therefore, the pitch angle is corrected to make all the feature point trajectories in parallel with each other as much as possible.

Incidentally, regarding a pair of feature point trajectories, one trajectory is selected from the trajectories on the left side in the traveling direction, the trajectory on the left side of the center of the own vehicle and a trajectory on its right side, in other words, the trajectory on the left side in the traveling direction and the trajectory on the right side in the traveling direction are combined with each other. The pairs of feature point trajectories may be all possible combinations or may be some pairs selected from all the possible combinations. The external parameter estimation unit 208 rewrites the pitch angle of the read external parameters 102B with the pitch angle estimated in step S701 and stores it in the RAM 102. In other words, the external parameters 102B stored in the RAM 102 are updated by the processing in step S701.

In step S702, the external parameter estimation unit 208 estimates a yaw angle. The external parameter estimation unit 208 uses the information of feature point trajectories regarding which "OK" is entered in the status column of the tracking point information 102A, and the external parameters 102B which are updated by the processing of step S701, for an arithmetic operation.

The external parameter estimation unit 208 designs an objective function for evaluating verticality of a feature point trajectory, that is, a degree of how the relevant trajectory follows along the traveling direction in the bird's-eye view. Then, the external parameter estimation unit 208 implements the estimation of the yaw angle by minimizing the objective function regarding the yaw angle by a known technology. The objective function in step S702 standardize on a function for evaluating vertically of one feature point trajectory and designs a total sum of objective functions regarding all the feature point trajectories as the objective function for estimating the pitch angle. Therefore, the yaw angle is calculated so that all the feature point trajectories face in the vertical direction as much as possible. The external parameter estimation unit 208 rewrites the yaw angle of the read external parameters 102B with the yaw angle estimated in step S702 and stores it in the RAM 102.

In step S703, the external parameter estimation unit 208 estimates a roll angle. The external parameter estimation unit 208 uses the information of feature point trajectories regarding which "OK" is entered in the status column of the tracking point information 102A, and the external parameters 102B which are updated by the processing in step S702, for an arithmetic operation.

The external parameter estimation unit 208 designs an objective function for evaluating the difference between the length of a feature point trajectory on the left side of the center of the own vehicle and the length of a feature point trajectory on the right side and implements the estimation of the roll angle by minimizing the objective function regarding the roll angle by a known technology. The objective function in step S703 is designed to minimize the difference between an average value of all feature point trajectory lengths on the left side of the own vehicle and an average value of all feature point trajectory lengths on the right side of the own vehicle. Therefore, the roll angle is corrected so that the difference between all the feature point trajectory lengths on the left side of the own vehicle and all the feature point trajectory lengths on the right side of the own vehicle become as smaller as possible, that is, such difference becomes close to an ideal bird's-eye view point. The external parameter estimation unit 208 rewrites the roll angle of the read external parameters 102B with the roll angle estimated in step S703 and stores it in the RAM 102.

In step S704, the external parameter estimation unit 208 estimates a height. The external parameter estimation unit 208 uses the information of feature point trajectories regarding which "OK" is entered in the status column of the tracking point information 102A, and the external parameters 102B which are updated by the processing of step S703, for an arithmetic operation.

The external parameter estimation unit 208 implements the estimation of the height by minimizing an objective function, which indicates the difference between lengths of feature point trajectories and an ideal trajectory length predicted from the vehicle motion information, regarding the height according to a known technology. The objective function is designed to minimize the difference between all the feature point trajectory lengths and the ideal trajectory length. Therefore, the height is corrected so that the difference between all the feature point trajectories and the ideal trajectory length becomes as small as possible, that is, becomes close to the ideal bird's-eye view point. The external parameter estimation unit 208 rewrites the heigh of the read external parameters 102B with the height estimated in step S704 and stores it in the RAM 102.

According to the aforementioned first embodiment, the following operational advantages can be obtained.

(1) The calibration apparatus 100 is mounted in the vehicle P. The calibration apparatus 100 includes: the image acquisition unit 201 that acquires captured images acquired by the camera 111, which is mounted in the vehicle P, capturing images of surroundings of the vehicle P; the feature point extraction unit 202 that extracts a plurality of feature points from the captured images; the tracking unit 203 that tracks the same feature point from a plurality of the captured images captured at different times with respect to each of the plurality of feature points, which are extracted from the feature point extraction unit 202, and records the tracked feature point as a feature point trajectory; the lane recognition unit 103B that recognizes the own vehicle's lane which is a driving lane on which the vehicle P is running, from the captured images, the sorting unit 204 that sorts out the feature point trajectory, which is in the same plane as a plane included in the own vehicle's lane recognized by the lane recognition unit 103B, among feature point trajectories tracked and recorded by the tracking unit 203; and the external parameter estimation unit 208 that estimates external parameters for the camera 111 by using the feature point trajectory sorted out by the sorting unit 204.

Since the calibration apparatus 100 sorts out the feature points included in the own vehicle's lane and uses them for the estimation of the external parameters, it is possible to avoid using the feature points which do not exist in the same plane for the calibration as illustrated in FIG. 3. Specifically speaking, even when the calibration apparatus 100 performs the calibration while actually running on the road, it can implement the calibration with high accuracy. Also, this method does not require any additional sensor, and recognizes the driving lane by using the images captured by the camera 111, so that the calibration apparatus 100 is excellent in terms of cost.

(2) The calibration apparatus 100 includes the load setting unit 205 that performs weighting based on accuracy in recognizing the feature point(s) tracked by the tracking unit 203. The external parameter estimation unit 208 estimates the external parameters so that the feature point to which the weighting with a larger value is set by the load setting unit 205 has a higher evaluated value. Therefore, the feature point recognition accuracy can be reflected in the estimation of the external parameters.

(3) The load setting unit 205 decides the weighting on the basis of the corner strength of the feature point.

(4) Upon setting of the weighting to a feature point of a white line, the load setting unit 205 sets the weighting for a feature point of a white broken line to be larger than the weighting for a feature point of a white solid line. Therefore, the image recognition accuracy can be reflected in the estimation of the external parameters.

(5) The sorting unit 204 sorts out a feature point regarding which a difference between the trajectory length tracked by the tracking unit 203 and an ideal trajectory length is shorter than a predetermined length (S606 in FIG. 8: NO), whose trajectory tracked by the tracking unit 203 has linearity (S606 in FIG. 8: NO), and which is included in the own vehicle's lane (S603 in FIG. 8: NO). Therefore, the calibration apparatus 100 uses an appropriate feature point(s), so that it can estimate the external parameters with high accuracy.

(6) The sorting unit 204: calculates the length of a feature point trajectory in the same plane as the plane included in the own vehicle's lane recognized by the lane recognition unit 103B on the basis of the speed information acquired by the vehicle motion acquisition unit 210 and the acquisition time interval for the plurality of captured images acquired by the image acquisition unit 201; and excludes the feature point trajectory from feature point trajectories used for the estimation by the external parameter estimation unit 208 if the length of the feature point trajectory does not satisfy a specified value. Therefore, the inappropriate feature point trajectory can be excluded from the estimation of the external parameters.

(Variation 1)

In the aforementioned embodiment, the vehicle motion acquisition unit 210 for the calibration apparatus 100 receives the outputs from the vehicle speed sensor 105 and the steering angle sensor 106. However, the vehicle motion acquisition unit 210 may accept positional information of the own vehicle P as input. For example, if the own vehicle P includes a GPS receiver, the vehicle motion acquisition unit 210 may receive the input of the positional information of the vehicle P from the GPS receiver and the vehicle motion acquisition unit 210 may output the positional information, which has been input, directly as the vehicle motion information to the program for calibration while running 103A. Incidentally, the GPS receiver calculates the position of the own vehicle P, that is, the latitude and longitude of the own vehicle P by receiving radio waves from a plurality of satellites, which constitute a satellite navigation system, and analyzing a signal included in the radio waves.

(Variation 2)

The calibration apparatus 100 may not include either one of the implementation judgment unit 207 and the adoptability judgment unit 209. If each one of them is not included in the calibration apparatus 100, the processing is executed in a manner similar to the case where the configuration not including them obtains an affirmative judgment. For example, if both the implementation judgment unit 207 and the adoptability judgment unit 209 are not included in the calibration apparatus 100, once the accumulation unit 206 records the feature point trajectories in the RAM 102, the following processing will be executed. Specifically speaking, the external parameter estimation unit 208 estimates the external parameters 102B and the external parameters 102B estimated by the external parameter estimation unit 208 are directly recorded, as the external parameters 112A, in the flash memory 112.

(Variation 3)

Regarding the operations of the sorting unit 204, all steps S604 to S608 in FIG. 8 may be omitted, or only steps S604 to S606 may be omitted, or only steps S607 and S608 may be omitted. Specifically speaking, it is essential for the sorting unit 204 to make the judgment based on the positional relationship between the feature points and the own vehicle's lane as indicated in steps S601 to S603 and the additional sorting in steps S604 to S608 may not be performed.

(Variation 4)

Referring to FIG. 1, the program for calibration while running 103A and the lane recognition program 103B have been explained as separate programs. However, it is only necessary for the calibration apparatus 100 to have the functions of both the programs and such functions may be implemented by one program or may be implemented by three or more programs.

The aforementioned respective embodiments and variations have described that the programs are stored in the ROM 103; however, the programs may be stored in the flash memory 112. Moreover, the calibration apparatus 100 may include an input/output interface (which is not illustrated in the drawings) and the programs may be read from another apparatus via the input/output interface and a medium which can be used by the calibration apparatus 100, whenever necessary. The medium herein used means, for example, a storage medium which is attachable to, or detachable from, the input/output interface, or a communication medium, that is, a network such as a wired, wireless, or optical network, or carrier waves or digital signals which propagate over the network. Furthermore, some or all of the functions implemented by the programs may be implemented by a hardware circuit or an FPGA.

The aforementioned embodiments and variations may be combined with each other. Various embodiments and variations have been described above; however, the present invention is not limited to the content of these embodiments and variations. Other aspects which can be thought of within the scope of the technical idea of the present invention are also included within the scope of the present invention.

Incidentally, the disclosure content of the following basic priority application is incorporated herein by reference: Japanese Patent Application No. 2018-237407 (filed on Dec. 19, 2018).

REFERENCE SIGNS LIST

100: calibration apparatus
101: CPU
102B, 112A: external parameters
103B: lane recognition unit
103C: external parameter initial values
104: display device
105: vehicle speed sensor
106: steering angle sensor
111: camera
112: flash memory
201: image acquisition unit
202: feature point extraction unit
203: tracking unit
204: sorting unit
205: load setting unit
206: accumulation unit
207: implementation judgment unit
208: external parameter estimation unit
209: adoptability judgment unit
210: vehicle motion acquisition unit

The invention claimed is:

1. A calibration apparatus mounted in a vehicle and comprising:
    an image acquisition unit configured to acquire captured images obtained by a camera, which is mounted in the vehicle, capturing images of surroundings of the vehicle;
    a feature point extraction unit configured to extract a plurality of feature points from the captured images;
    a tracking unit configured to track the same feature point from a plurality of the captured images captured at different times with respect to each of the plurality of feature points, which are extracted by the feature point extraction unit, and record the tracked feature point as a feature point trajectory;
    a lane recognition unit configured to recognize an own vehicle's lane which is a driving lane on which the vehicle is running, from the captured images;
    a sorting unit configured to sort out the feature point trajectory, which is in the same plane as a plane included in the own vehicle's lane recognized by the lane recognition unit among feature point trajectories tracked and recorded by the tracking unit; and
    an external parameter estimation unit configured to estimate external parameters for the camera by using the feature point trajectory sorted out by the sorting unit.

2. The calibration apparatus according to claim 1, comprising a vehicle motion acquisition unit configured to acquire speed information of the vehicle,
    wherein the sorting unit calculates a length of the feature point trajectory which is in the same plane as the plane included in the own vehicle's lane recognized by the lane recognition unit, on the basis of the speed information acquired by the vehicle motion acquisition unit and the plurality of the captured images acquired by the image acquisition unit; and
    when the length of the feature point trajectory is less than a specified value, the feature point trajectory is excluded from the feature point trajectories used for the estimation by the external parameter estimation unit.

3. The calibration apparatus according to claim 1,
    further comprising a load setting unit configured to perform weighting based on accuracy in recognizing the feature point tracked by the tracking unit,
    wherein the external parameter estimation unit estimates the external parameters so that the feature point to which the weighting with a larger value is set by the load setting unit has a higher evaluated value.

4. The calibration apparatus according to claim 3,
wherein the load setting unit decides the weighing on the basis of corner strength of the feature point.

5. The calibration apparatus according to claim 3,
wherein upon setting of the weighting to a feature point of a white line, the load setting unit sets the weighting for a feature point of a white broken line to be larger than the weighting for a feature point of a white solid line.

6. The calibration apparatus according to claim 1,
wherein the sorting unit sorts out a feature point regarding which a difference between the trajectory length tracked by the tracking unit and an ideal trajectory length is shorter than a predetermined length, and which is included in the own vehicle's lane.

7. The calibration apparatus according to claim 1,
wherein the sorting unit sorts out a feature point whose trajectory tracked by the tracking unit has linearity and which is included in the own vehicle's lane.

8. The calibration apparatus according to claim 1,
wherein the sorting unit sorts out a feature point regarding which a difference between the trajectory length tracked by the tracking unit and an ideal trajectory length is shorter than a predetermined length, whose trajectory tracked by the tracking unit has linearity, and which is included in the own vehicle's lane.

9. A calibration method executed by a calibration apparatus mounted in a vehicle and including an image acquisition unit configured to acquire captured images obtained by a camera, which is mounted in the vehicle, capturing images of surroundings of the vehicle, the calibration method comprising:
extracting a plurality of feature points from the captured images;
tracking the same feature point from a plurality of the captured images captured at different times with respect to each of the plurality of feature points, which are extracted from the captured images, and recording the tracked feature point as a feature point trajectory;
recognizing an own vehicle's lane which is a driving lane on which the vehicle is running, from the captured images;
sorting out the feature point trajectory, which is in the same plane as a road surface included in the own vehicle's lane, among tracked and recorded feature point trajectories;
estimating external parameters for the camera by using the sorted feature point trajectory.

* * * * *